US008595063B2

(12) United States Patent
Martin et al.

(10) Patent No.: US 8,595,063 B2
(45) Date of Patent: Nov. 26, 2013

(54) APPARATUS, METHOD, AND COMPUTER PROGRAM PRODUCT FOR REWARDING HEALTHY BEHAVIORS AND/OR ENCOURAGING APPROPRIATE PURCHASES WITH A REWARD CARD

(75) Inventors: Lane R. Martin, Atlanta, GA (US); Alec S. Wilkins, Salt Lake City, UT (US); Jennifer W. Vanderwall, Wilton, CT (US)

(73) Assignee: Mastercard International Incorporated, Purchase, NY (US)

( * ) Notice: Subject to any disclaimer, the term of this patent is extended or adjusted under 35 U.S.C. 154(b) by 182 days.

(21) Appl. No.: 12/781,893

(22) Filed: May 18, 2010

(65) Prior Publication Data

US 2011/0015960 A1 Jan. 20, 2011

Related U.S. Application Data

(60) Provisional application No. 61/179,430, filed on May 19, 2009, provisional application No. 61/296,637, filed on Jan. 20, 2010.

(51) Int. Cl.
*G06Q 30/00* (2012.01)

(52) U.S. Cl.
USPC ...................................................... 705/14.27

(58) Field of Classification Search
USPC ...................................................... 705/14.27
See application file for complete search history.

(56) References Cited

U.S. PATENT DOCUMENTS

| | | | |
|---|---|---|---|
| 6,151,586 A | 11/2000 | Brown | |
| 7,010,512 B1 | 3/2006 | Gillin et al. | |
| 7,254,557 B1 | 8/2007 | Gillin et al. | |
| 7,392,224 B1 * | 6/2008 | Bauer et al. | 705/41 |
| 2002/0111827 A1 | 8/2002 | Levin et al. | |
| 2002/0123925 A1 * | 9/2002 | Smith | 705/14 |
| 2003/0023549 A1 * | 1/2003 | Armes et al. | 705/40 |

(Continued)

FOREIGN PATENT DOCUMENTS

WO WO-00-67411 A2 11/2000

OTHER PUBLICATIONS

Garman, E. Thomas, "Employer-Sponsored Education Programs and Incentives to Improve Employees' Financial Lifestyles," 1999, Employment Relations Today, Winter 1999, pp. 64-72.*

(Continued)

*Primary Examiner* — David Rines
*Assistant Examiner* — Amanda Gurski
(74) *Attorney, Agent, or Firm* — Otterstedt, Ellenbogen & Kammer, LLP

(57) ABSTRACT

A wellness program is set up for employees of an employer and participation in the program by at least a first one of the employees of the employer is tracked to determine if the at least first one of the employees has earned a reward by virtue of the participation. In response to determining that the reward has been earned, it is determined whether this is the employee's initial earned reward. If such is the case, a reward payment card is created for the employee; an amount associated with the reward payment card is initialized; and the card is provided to the employee. Subsequently-made purchases by the employee with the card are detected. In some cases, based on purchase level data associated with the subsequently-made purchases, it is determined if the employee is eligible for a supplemental award; if this is the case, supplemental award value is associated to the reward payment card. In other instances, purchase-level data associated with at least those of the subsequently-made purchases which are qualified purchases is reported to the employer.

39 Claims, 9 Drawing Sheets

(56) References Cited

U.S. PATENT DOCUMENTS

| | | | |
|---|---|---|---|
| 2006/0116960 A1 | 6/2006 | Gillin et al. | |
| 2007/0150309 A1 | 6/2007 | Taylor | |
| 2008/0177558 A1 | 7/2008 | Jung | |
| 2008/0197182 A1* | 8/2008 | Jackson | 229/247 |
| 2008/0197185 A1* | 8/2008 | Cronin et al. | 235/375 |
| 2008/0201175 A1 | 8/2008 | Levin et al. | |
| 2008/0255979 A1* | 10/2008 | Slutzky et al. | 705/35 |
| 2009/0076903 A1 | 3/2009 | Schwarzberg et al. | |
| 2009/0089085 A1 | 4/2009 | Schoenberg | |
| 2009/0234742 A1* | 9/2009 | Hart | 705/14 |
| 2012/0059701 A1* | 3/2012 | van der Veen et al. | 705/14.17 |

OTHER PUBLICATIONS

"Ecount Introduces Health Care Incentives Suite". downloaded from http://www.redorbit.com/news/health/893957/ecount_introduces_health_care_incentives_suite/index.html.

"Tangerine Wellness Teams with Ecount." downloaded from http://www.corp.prepaid.citi.com/about/2008news/feb-26/2008.html.

"Visa Incentive Card: Employee Rewards" http://usa.visa.com/corporate/corporate_solutions/payment/incentive_emp_rewards.html.

"City of San Antonio Employee Wellness Program" http://www.sanantonio.gov/hr/employee_information/wellness/pdf/RewardsProgram/Rewards%20Program%20info%20sheet.pdf.

"Boost Your Benefits Program Participation" http://www.corp.prepaid.citi.com/promotions/benefits-rewards.html.

"Vanguard Travel" http://www.vanguardtravelunlimited.com/incentive_travel/gift_cards.html.

Citi Prepaid Services, downloaded from http://www.nasact.org/conferences_training/nasact/Conferences/AnnualConferences/2008AnnualConference/PresentationsHandouts/CS9/CS9_Tiede.

* cited by examiner

APPARATUS, METHOD, AND COMPUTER PROGRAM PRODUCT FOR REWARDING HEALTHY BEHAVIORS AND/OR ENCOURAGING APPROPRIATE PURCHASES WITH A REWARD CARD

CROSS-REFERENCE TO RELATED APPLICATIONS

This patent application claims the benefit of U.S. Provisional Patent Application Ser. No. 61/179,430 filed on May 19, 2009 and entitled "Re-Loadable Prepaid Payment Device and Method for Rewarding Healthy Behaviors and Encouraging Healthcare Purchases." The complete disclosure of the aforementioned Provisional Patent Application Ser. No. 61/179,430 is expressly incorporated herein by reference in its entirety for all purposes. This patent application also claims the benefit of U.S. Provisional Patent Application Ser. No. 61/296,637 filed on Jan. 20, 2010 and entitled "Apparatus, Method, and Computer Program Product for Encouraging Appropriate Purchases with a Reward Card via Matching." The complete disclosure of the aforementioned Provisional Patent Application Ser. No. 61/296,637 is also expressly incorporated herein by reference in its entirety for all purposes.

FIELD OF THE INVENTION

The present invention relates generally to electronic commerce, and, more particularly, to electronic payment systems.

BACKGROUND OF THE INVENTION

Employers today implement and manage incentive programs for employees. These programs include cash and non-cash incentives for employees. Currently, once the incentive is awarded the employer loses visibility into how the incentive is used.

A corporate prepaid account relating to healthcare can be used by an employer to load employee health savings account/healthcare reimbursement account/flexible spending account (HSA/HRA/FSA) contributions, making it convenient for employees to access their funds at the point of purchase or service, as the case may be. The card is loaded by the employer (or third party) with the employee's contribution dollars and the employee spends against its value for qualified expenses. Another use of a prepaid card in the corporate healthcare arena is a simple gift card, as part of an incentive program. Closed loop cards are most commonly used in such applications. They are typically given by an employer to an employee for participation in a corporate healthcare program. An example may be that an employer would offer $100 gift cards to an athletic store for employees who complete a health screening on the company's intranet site.

SUMMARY OF THE INVENTION

Principles of the present invention provide techniques for rewarding healthy behaviors and/or encouraging appropriate purchases with a reward card. An exemplary embodiment of a method (which can be computer-implemented), according to one aspect of the invention, includes the steps of setting up a wellness program for employees of an employer; and tracking participation in the program by at least a first one of the employees of the employer, to determine if the at least first one of the employees has earned a reward by virtue of the participation. An additional step, carried out in response to determining that the at least first one of the employees has earned the reward by the participation, includes determining whether the earning of the reward by the participation is an initial earned reward for the at least first one of the employees. Further steps, carried out in response to determining that the earning of the reward by the participation is the initial earned reward for the at least first one of the employees, include creating a reward payment card for the at least first one of the employees; initializing an amount associated with the reward payment card for the at least first one of the employees; and providing the reward payment card to the at least first one of the employees. Still further steps include detecting subsequently-made purchases by the at least first one of the employees with the reward payment card; based on purchase level data associated with the subsequently-made purchases, determining if the at least first one of the employees is eligible for a supplemental award; and, responsive to determining that the at least first one of the employees is eligible for the supplemental award, associating supplemental award value to the reward payment card.

In another aspect, an exemplary embodiment of a method (which can be computer-implemented), includes the step of tracking participation in a wellness program for employees of an employer by at least a first one of the employees of the employer, to determine if the at least first one of the employees has earned a reward by the participation. An additional step, in response to determining that the at least first one of the employees has earned the reward by the participation, includes providing a reward payment card, with an initial amount associated therewith, to the at least first one of the employees. Further steps include detecting subsequently-made purchases by the at least first one of the employees with the reward payment card; based on purchase level data associated with the subsequently-made purchases, determining if the at least first one of the employees is eligible for a supplemental award; and, responsive to determining that the at least first one of the employees is eligible for the supplemental award, associating supplemental award value to the reward payment card.

In still another aspect, an exemplary embodiment of a method (which can be computer-implemented), includes the steps of setting up a wellness program for employees of an employer; and tracking participation in the program by at least a first one of the employees of the employer, to determine if the at least first one of the employees has earned a reward by the participation. An additional step, carried out in response to determining that the at least first one of the employees has earned the reward by the participation, includes determining whether the earning of the reward by the participation is an initial earned reward for the at least first one of the employees. Further steps, carried out in response to determining that the earning of the reward by the participation is the initial earned reward for the at least first one of the employees, include creating a reward payment card for the at least first one of the employees; initializing an amount associated with the reward payment card for the at least first one of the employees; and providing the reward payment card to the at least first one of the employees. Further steps include detecting subsequently-made purchases by the at least first one of the employees with the reward payment card; and reporting to the employer purchase-level data associated with at least those of the subsequently-made purchases which are qualified purchases.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
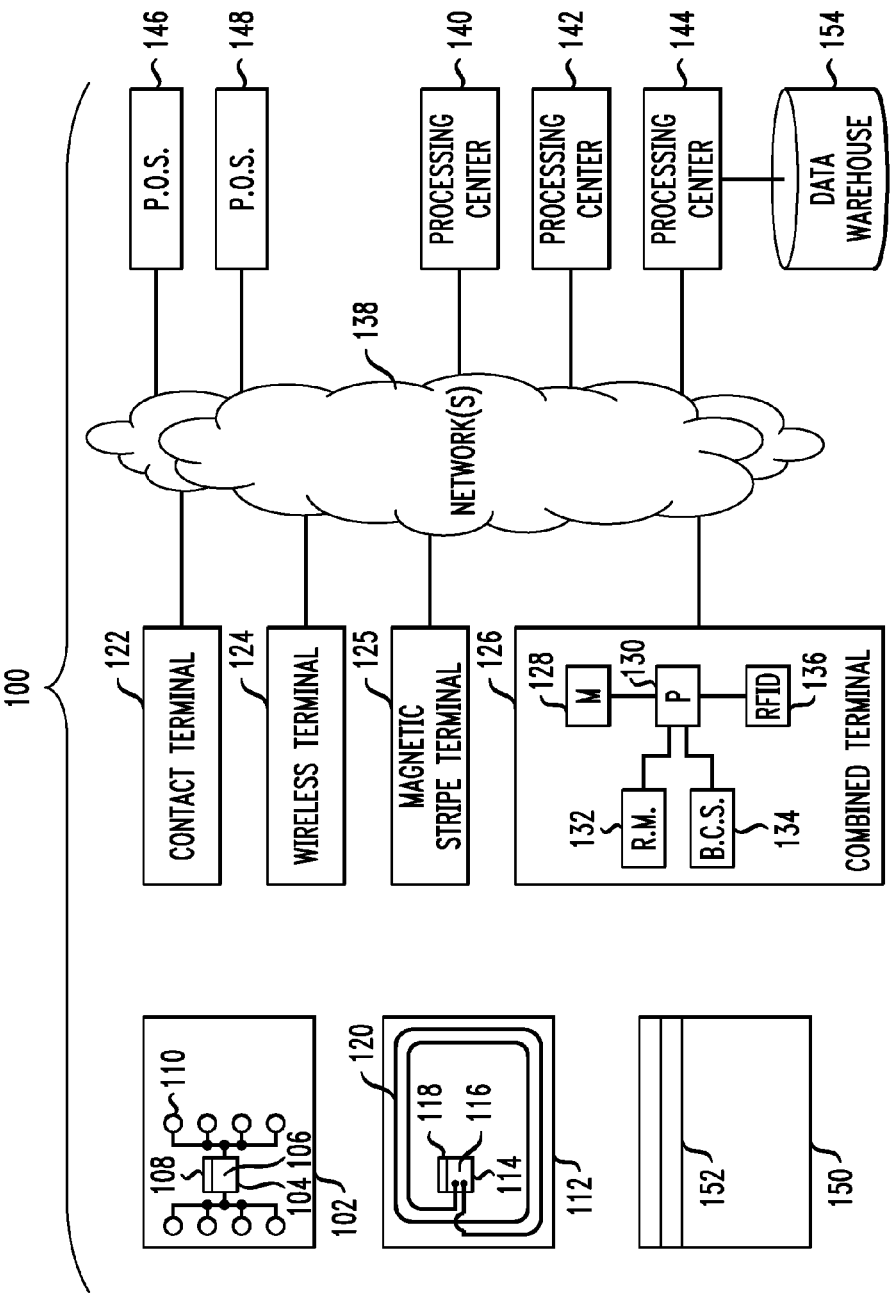
FIG. 1 shows an example of a system that can implement techniques of the invention.

Attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the invention. Other types of devices could include a conventional card 150 having a magnetic stripe 152, an appropriately configured cellular telephone handset, and the like. Indeed, techniques of the present invention can be adapted to a variety of different types of cards, terminals, and other devices, configured, for example, according to a payment system standard (and/or specification).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic techniques.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited. St. Andrews House, The Links, Kelvin Close, Birchwood, Warrington, WA3 7PB. United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that, strictly speaking, the EMV specification defines the behavior of a terminal; however, the card can be configured to conform to such EMV-compliant terminal behavior and in this sense is itself EMV-compliant. It will also be appreciated that applications can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

EMV Integrated Circuit Card Specifications for Payment Systems Book 1 Application Independent ICC to Terminal Interface Requirements Version 4.2 June 2008

EMV Integrated Circuit Card Specifications for Payment Systems Book 2 Security and Key Management Version 4.2 June 2008

EMV Integrated Circuit Card Specifications for Payment Systems Book 3 Application Specification Version 4.2 June 2008

EMV Integrated Circuit Card Specifications for Payment Systems Book 4 Cardholder, Attendant, and Acquirer Interface Requirements Version 4.2 June 2008

In some cases, implementations conform to pertinent ISO standards, such as ISO 8583. Individual entities or groups may develop specifications within this standard.

As noted, cards 102, 112 are examples of a variety of payment devices that can be employed with techniques of the invention. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a magnetic stripe (or other technology) card can be employed, as discussed below.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (for example, a virtual private network, such as the BANKNET® virtual private network (VPN) of MasterCard International Incorporated off Purchase, N.Y., USA. More than one network could be employed to connect different elements of the system. For example, a local area network (LAN) could connect a terminal to a local server or other computer at a retail establishment. A payment network could connect acquirers and issuers. Processing centers 140, 142, 144 can include, for example, a host computer of an issuer of a payment device (or processing functionality of other entities discussed and illustrated herein, such as in FIGS. 2, 3, 4, and 6).

Many different retail or other establishments, as well as other entities, generally represented by points-of-sale 146, 148, can be connected to network 138. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

The portable device can include a body portion. For example, this could be a laminated plastic body (as discussed above) in the case of "smart" cards 102, 112, or the handset chassis and body in the case of a cellular telephone.

It will be appreciated that the terminals 122, 124, 125, 126 are examples of terminal apparatuses for interacting with a payment device of a holder in accordance with one or more exemplary embodiments of the present invention. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. In some instances, the aforementioned bar code scanner 134 and/or RFID tag reader 136 can be provided, and can be coupled to the processor, to gather attribute data, such as a product identification, from a UPC code or RFID tag on a product to be purchased. The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128, which then contactlessly transmits the electronic data to the proximity IC chip in the card 112 or other wireless device. Magnetic stripe cards can be swiped in a well-known manner.

One or more of the processing centers 140, 142, 144 can include a database such as a data warehouse 154 for storing information of interest.

Figure 2:
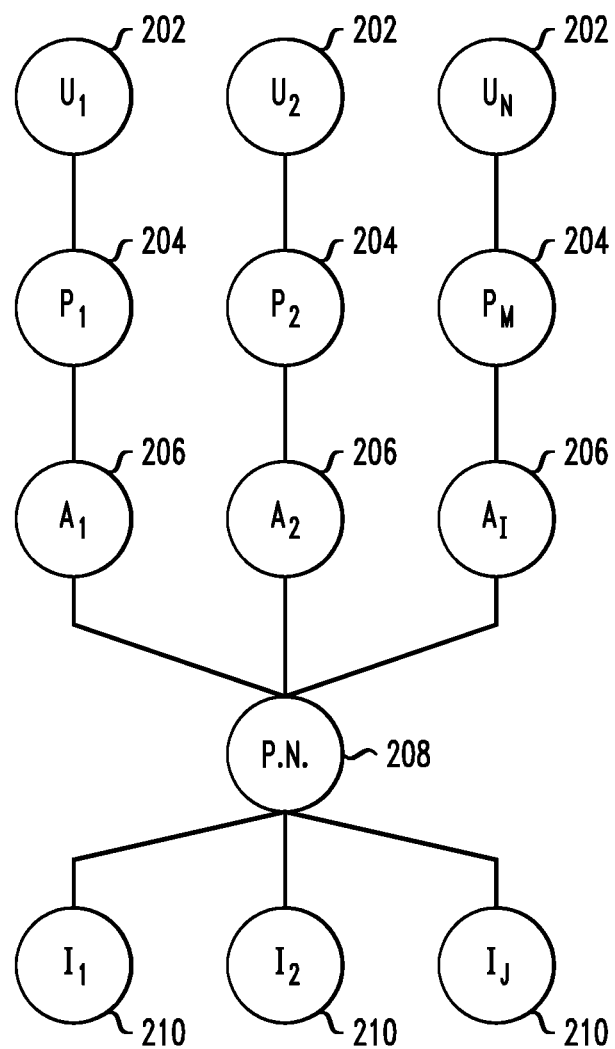
FIG. 2 depicts an exemplary inter-relationship between and among: (i) a payment network configured to facilitate transactions between multiple issuers and multiple acquirers, (ii) a plurality of users, (iii) a plurality of providers or other merchants, (iv) a plurality of acquirers, and (v) a plurality of issuers.

With reference to FIG. 2, an exemplary relationship among multiple entities is depicted. A number of different users 202, $U_1, U_2 \ldots U_N$, interact with a number of different merchants 204, $P_1, P_2 \ldots P_M$. In general, users 202 could be, for example, employees, while merchants 204 could be, for example, purveyors of health and/or fitness-related products and/or services. Merchants 204 interact with a number of different acquirers 206, $A_1, A_2 \ldots A_I$. Acquirers 206 interact with a number of different issuers 210, $I_1, I_2 \ldots I_J$, through, for example, a single operator 208 of a payment network configured to facilitate transactions between multiple issuers and multiple acquirers; for example, MasterCard International Incorporated, operator of the BANKNET® network, or Visa International Service Association, operator of the VISA-NET® network. In general, N, M, I, and J are integers that can be equal or not equal.

During a conventional authorization process, the cardholder 202 pays for the purchase and the merchant 204 submits the transaction to the acquirer (acquiring bank) 206. The acquirer verifies the card number, the transaction type and the amount with the issuer 210 and reserves that amount of the cardholder's credit limit for the merchant. Authorized transactions are stored in "batches", which are sent to the acquirer 206. During clearing and settlement, the acquirer sends the batch transactions through the credit card association, which debits the issuers 210 for payment and credits the acquirer 206. Once the acquirer 206 has been paid, the acquirer 206 pays the merchant 204. One or more embodiments of the invention make use of pre-paid cards, wherein the card-holder spends money which has been "stored" via a prior deposit (for example, by the employer 350, as discussed below, to reward participation in the wellness program). Such pre-paid cards typically carry a credit-card brand (such as, for example, MasterCard brand, Visa brand, American Express brand, or Discover brand) and can be used in similar ways. Instead of checking a purchase against an available credit limit, it can be checked against the available stored balance.

It will be appreciated that the network 208 shown in FIG. 2 is an example of a payment network configured to facilitate transactions between multiple issuers and multiple acquirers, which may be thought of as an "open" system. Some embodiments of the invention may be employed with other kinds of payment networks, for example, proprietary or closed payments networks with only a single issuer and acquirer, such as the AMERICAN EXPRESS network (mark of American Express Company) (it being appreciated that the latter is a non-limiting example of a proprietary or closed payment network).

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

In one or more embodiments, a re-loadable prepaid card is given from an employer to an employee, as a consolidated source for incentives for participation in health and wellness programs. The trigger could be linked to any activity; typically to a component of a health and wellness program such as participation, completion or achievement of a program goal (e.g. smoking cessation). Completion of trigger activities results in timely financial rewards for employees. The value of the prepaid card can be programmed exclusively for use at healthcare-related merchants or can be available for use anywhere (open access). A fully integrated product configuration would include partnerships with wellness and incentive vendors, issuer processors, issuers and an operator 208, to deliver a recurring incentive offering for the cardholder for completing tasks established by the employer. The employer receives data from the collaborative group to show "return" on incentive dollars through purchase level data originated by the cardholder. An issuer processor is a third party contractor who does transaction processing on behalf of an issuer. In one or more embodiments, such issuer processors may receive a share of revenue from the issuer and may assume the bulk of the processing overhead for the program.

Operator 208 coordinates the required parties to deliver the functionality needed to provide this integrated solution to employers. A designated product code (such as MHA as employed by MasterCard International Incorporated of Purchase, N.Y., USA) is used by issuers to track and catalogue performance. As discussed below, a personalized savings service that could be adapted to embodiments of the invention is the MasterCard Savings™ service, as provided by MasterCard International Incorporated of Purchase, N.Y., USA. Such a personalized savings service could be applied to a wellness rewards product, in accordance with one or more embodiments of the invention, when an employer chooses an "open access" card for employees.

One or more embodiments of the invention deliver a re-loadable prepaid product and transaction level information to employers to assist efforts to deliver incentives to promote a healthy workforce. By establishing wellness objectives tied to an automatic incentive delivery on a single source, employers can enhance and even optimize employee participation and outcomes.

To fully address the needs of employers, a partnered approach is desirable. Wellness and incentive vendors are experts in designing employer wellness programs to improve the health of employees through specific initiatives, (e.g. smoking cessation, weight management, and/or stress reduction). Issuer processors have the ability to provide transaction level information to parties, which could be tied into wellness vendor applications. Issuer processors also have the ability to filter merchant category codes (MCCs) based on employer or health plan preference. In one or more embodiments, issuing banks hold the account balances where the designated funds of the employer(s) reside, and operator 208 provides access to a personalized savings service and performs typical prepaid authorization, clearing, and settlement functions. Coordinating the existing functionality from these stakeholder groups under one solution is advantageous for employers and health plans.

Note that certain actions are mentioned herein as being performed by issuer processors. It is to be understood, however, that this is exemplary and not limiting; in other embodiments, such functionality could be undertaken, for example, by issuers or by the aforementioned operator 208 of the payment network (for example, MasterCard International Incorporated).

Preferably, in one or more embodiments of the invention, data is fed back to the employer, and fulfilling of predefined objectives results in automatic funding on a payment device.

Figure 3:
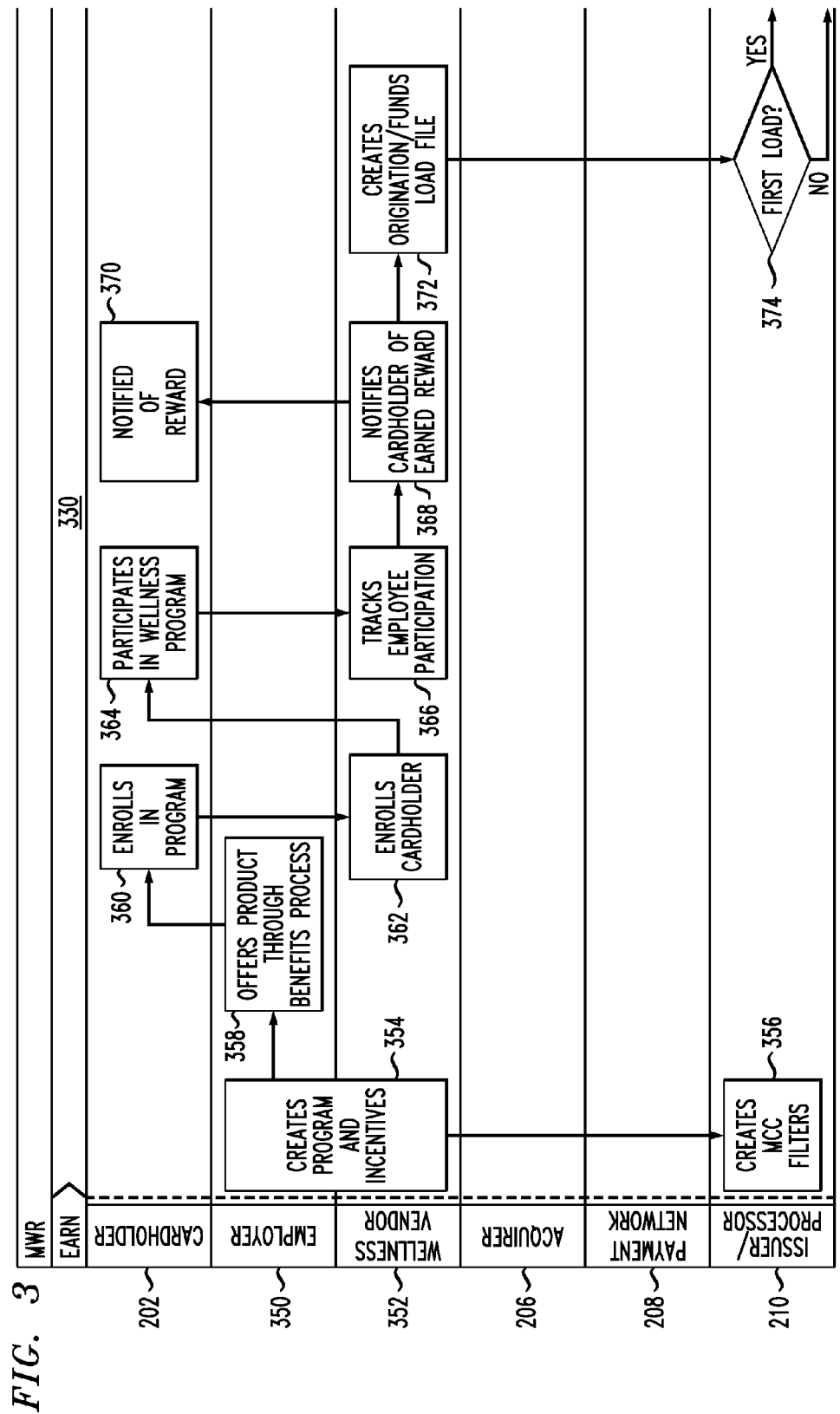
FIG. 3 shows a combined flow chart and block diagram, illustrative of data flow in an exemplary embodiment of a method and system, according to an aspect of the invention.
Figure 3:
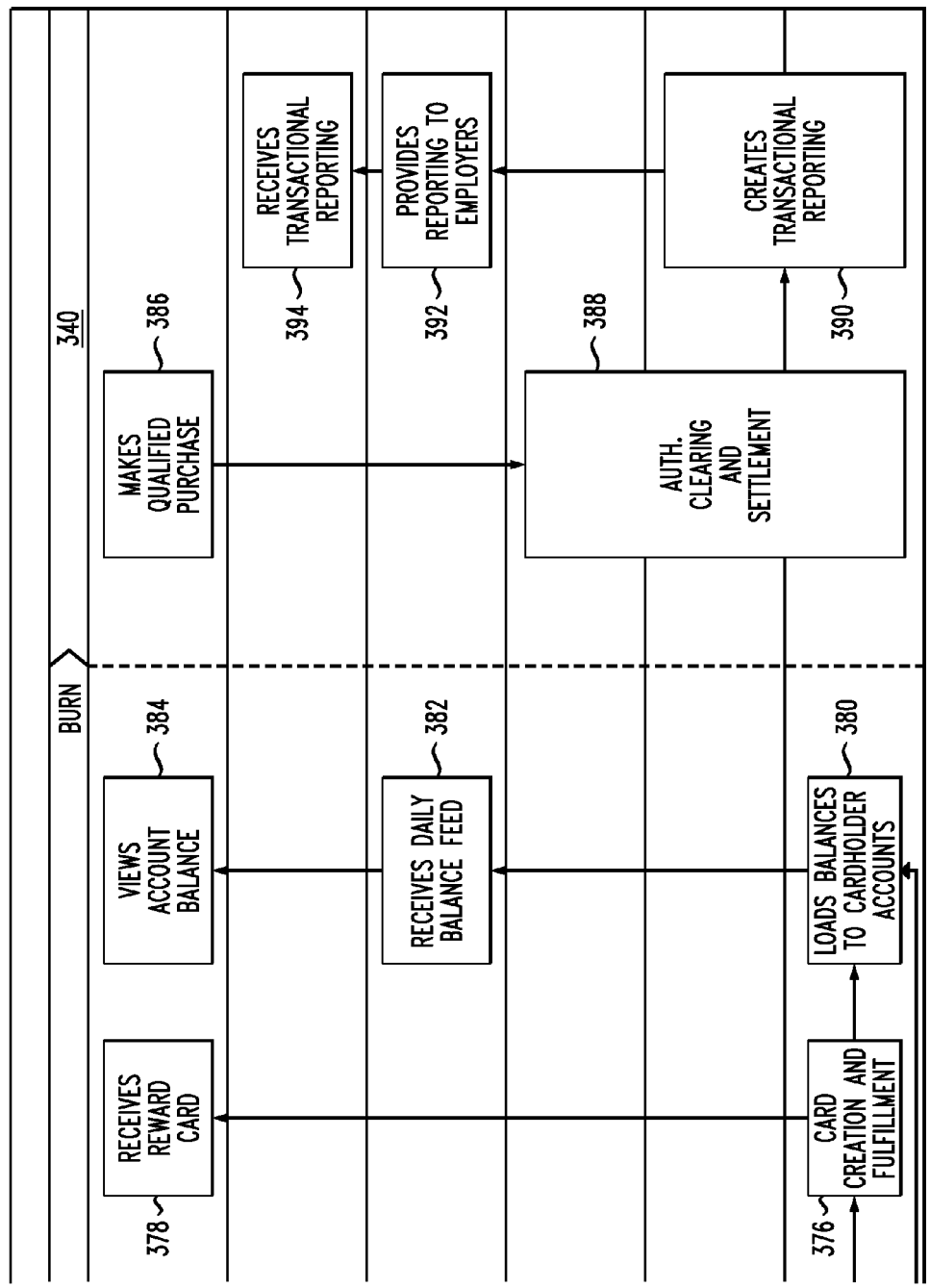

FIG. 3 shows a combined flow chart and block diagram, for a non-limiting exemplary embodiment of the invention. Parties include cardholder (e.g., employee) 202, employer 350, wellness vendor 352, acquirer 206, the aforementioned operator 208 of the payment network (for example, MasterCard International Incorporated), and issuer/processor 210. The techniques depicted in FIG. 3 can be implemented using a variety of systems. In one or more embodiments, the system as shown in FIG. 4 can be employed.

Figure 4:
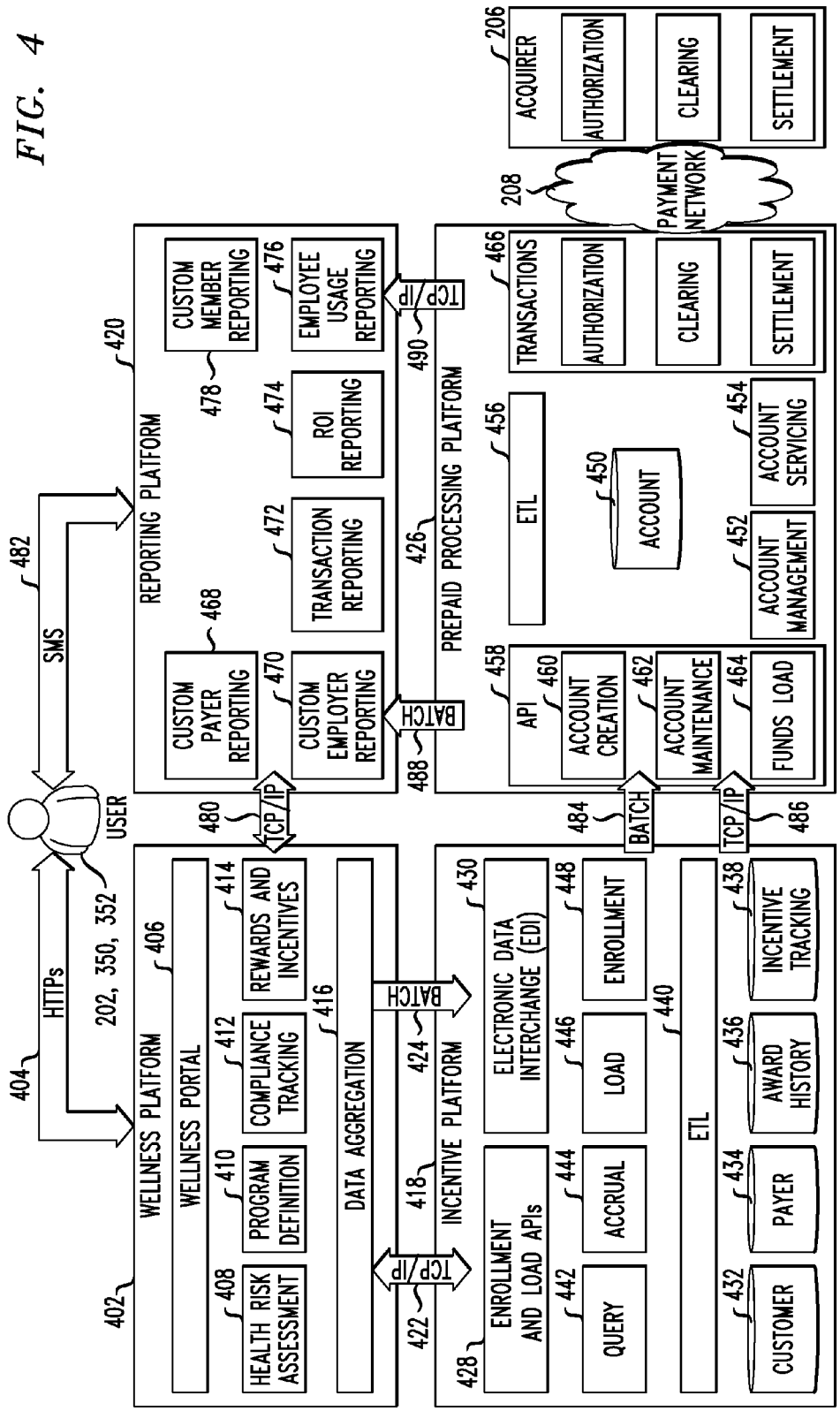
FIG. 4 is an exemplary system block diagram, according to another aspect of the invention.

FIG. 4 shows an exemplary system block diagram. The user is indicative of a number of individuals who might interface with the system, including the cardholder (employee) 202 in his or her capacity participating in the program; an employee or other agent or contractor acting on behalf of employer 350, and/or an employee or other agent or contractor acting on behalf of wellness vendor 352.

Wellness platform 402 may be provided, for example, by wellness vendor 352. The participating employee (cardholder) 202 or other user may access wellness platform 402, for example, over the Internet using secure hypertext transfer protocol (HTTP/s) link 404. Wellness platform 402 may be configured with a wellness portal 406 providing a variety of services and/or information, such as a health risk assessment 408, program definition 410, compliance tracking 412, and/or information on rewards and incentives 414. A suitable data aggregation routine 416 can be provided for communication of required data to incentive platform 418 and reporting platform 420. Communication back and forth between wellness platform 402 and incentive platform 418 can be carried out, for example, using transfer control protocol/internet protocol (TCP/IP) link 422. Data can also be batched from wellness platform 402 to incentive platform 418, as indicated at 424.

Incentive platform 418 may also be provided, for example, by wellness vendor 352. Incentive platform 418 includes suitable enrollment and load application program interfaces (APIs) 428 and can also exchange data using electronic data interchange (EDI) as per block 430. In one or more embodiments, the EDI layer 430 provides integration through the translation and creation of various file formats, thus creating flexibility in the integration with the front end wellness portal 406. Suitable databases are provided for data warehousing of customer and payer data, as well as award history and incentive tracking, as shown at 432, 434, 436, and 438, respectively. Appropriate extract, transform, and load (ETL) functionality is provided, as shown at block 440, for purposes of extracting data from the above-mentioned databases 432, 434, 436, 438, transforming it to fit operational needs (in one or more embodiments, the ETL layer normalizes and reformats data as needed for subsequent communications, both internal and external), and loading it to databases 432, 434, 436, 438 as well as to the outputs from ETL module 440, namely, batch 484 and/or TCP/IP 486. In one or more embodiments, ETL module 440 sits between any external outputs and the database layer. Note that loading in this context is distinct from load block 446 to be discussed shortly. Query block 442 is provided for purposes of running queries on databases 432, 434, 436, 438. Certain activities may be cumulative in nature, meaning that more than one occurrence of the activity may be required to trigger a funding reward to the prepaid card. The accrual block 444 tracks these cumulative activities until they reach the reward threshold. Load block 446 communicates with prepaid processing platform 426 to effectuate funds load onto the reward card. Enrollment block 448 interfaces with wellness platform 402 to enroll a user 202.

Prepaid processing platform 426 may be provided, for example, by issuer/processor 210 (for example, an issuer or an issuer processor or the combination of both) and/or by the operator of network 208. Prepaid processing platform 426 includes an account database 450 with account management and servicing modules 452, 454, respectively. Appropriate extract, transform, and load (ETL) functionality is provided, as shown at block 456, for purposes of extracting data from the account database 450 (or any other data resident with the processor), transforming it to fit operational needs (in one or more embodiments, the ETL layer normalizes and reformats data as needed for subsequent communications, both internal and external), and loading it to internal and external reporting and feeds 488, 490. API block 458 includes appropriate modules for account creation, account maintenance, and funds loading, as indicated at blocks 460, 462, and 464. A transactions module 466 handles authorization, clearing, and settlement, interacting with acquirer 206 for such purposes over payment network 208.

Reporting platform 420 may be provided, for example, by wellness vendor 352. Platform 420 can include modules 468, 470, 472, 474, 476, and 478 for, respectively, custom payer reporting, custom employer reporting, transaction reporting, ROI (return on investment) reporting, employee usage reporting, and custom member reporting. With regard to ROI, as discussed above, this could include, for example, purchase level data originated by the cardholder.

Wellness platform 402 and reporting platform 420 can communicate, for example, via TCP/IP link 480. Reporting platform 420 can communicate with, for example, employer 350, using short message service (SMS), as indicated at 482. Data can be moved from incentive platform 418 to prepaid processing platform 426 via both batch and a TCP/IP link, as indicated at 484, 486, respectively. Similarly, data can be moved from prepaid processing platform 426 to reporting platform 420 via both batch and a TCP/IP link, as indicated at 488, 490, respectively.

With reference again to FIG. 3, during "earn" phase 330, employer 350 and wellness vendor 352 create a wellness program with incentives, as per block 354. This can be carried out, for example, as follows. Vendor 352 can create wellness platform, incentive platform, and reporting platform 402, 418, 420, and can set up a relationship with issuer/processor 210 operating prepaid processing platform 426. Wellness platform 402 can then be used cooperatively by vendor 352 and employer 350 to create a wellness program specific to employer 350. Issuer processor 210 creates MCC filters, as per block 356, using, for example, prepaid processing platform 426. The MCC filters are employed in the case where the reward card is restricted to certain kinds of merchants. Employer 350 offers the wellness program through the benefits process, as per block 358; for example, by making wellness portal 406 accessible to one or more employees 202. Cardholder 202 enrolls in the program, as per block 360. Wellness vendor 352 enrolls the cardholder, as per block 362. Enrollment may be carried out, for example, by employee 202 using portal 406 to communicate with enrollment module 448 of incentive platform 418. Note, in some instances, restrictions could be "finer" than MCCs, for example, limited to one or more individual merchants and/or individual line items of merchandise.

Cardholder 202 then participates in the wellness program, as per block 364, and his or her participation is tracked by wellness vendor 352, as per block 366; for example, by having the employee use compliance tracking module 412 to enter progress, with data stored in incentive tracking database 438. Upon satisfaction of whatever trigger activity(ies) are appropriate (determined by appropriate logic in incentive platform 418), wellness vendor 352 notifies cardholder 202 of his or her reward, as per blocks 368 and 370, and creates an origination (funds load) file, as per block 372. These actions can be taken, for example, using rewards and incentives module 414 of wellness platform 402, and load module 446 of incentive platform 418.

In decision block 374, a determination is made as to whether the funds load is the first load for the card. If such is the case, as per the "YES" branch of block 374, card creation and fulfillment are carried out as per block 376, with the cardholder 202 receiving the rewards card in block 378. Step 374 may be carried out, for example, by block 460 in FIG. 4. Step 376 may be carried out, for example, by block 464 in FIG. 4. Issuer/processor 210 then loads the appropriate balance to the cardholder's account in block 380. Conversely, if this is not the first load, as per the "NO" branch of block 374, processing proceeds directly to block 380. Balance load can be carried out, for example, by issuer/processor 210 using prepaid processing platform 426 with funds load API 464 exposed to load module 446 of incentive platform 418 operated by wellness vendor 352. Vendor 352 receives a daily balance feed as per block 382, and cardholder 202 views his or her account balance as per block 384. The daily balance feed in step 382 may be created, for example, in block 476 of FIG. 4 and communicated to the wellness vendor 352 by TCP/IP link 480, for example. A view of the account balance for step 384 may be created, for example, in block 478 and communicated to the member by, for example, http/s link 404 or SMS link 482.

During "burn" phase 340, cardholder 202 makes a qualified purchase at a merchant, as per block 386. This purchase may be made at an appropriate merchant 204, using a conventional authorization request and response. Standard authorization, clearing, and settlement can be carried out between and among acquirer 206, the aforementioned operator 208 of the payment network, and issuer/processor 210, as indicated in block 388, again, using conventional techniques such as appropriate servers of a pertinent acquirer 206 and issuer 210, with appropriate software, communicating over network 208 in accordance with a payment system standard and/or specification. Issuer processor 210 and/or operator 208 then create appropriate transactional reporting, as per block 390, and the same is provided to wellness vendor 352, who in turn provides same to employer 350, as per block 392, with receipt in block 394. Step 390 can be carried out, for example, using conventional functionality in prepaid processing platform 426. Note, however, that in a preferred approach, custom reporting is provided, which is not standard for a prepaid processor. Steps 392 and 394 can be carried out, for example, using one or more modules of reporting platform 420.

At present, it is preferred that embodiments of the invention be implemented with the prepaid and/or stored value domains. Note that the terminology "prepaid" and "stored value" is used interchangeably herein. That is to say, information regarding the balance is not present on the card media, but rather is stored on the prepaid processing platform 426 operated by the issuer 210. This balance is accessed by the card using a standard authorization request and response, as described with regard to FIG. 2 above.

In view of the discussion thus far, it will be appreciated that, in general terms, a method, according to an aspect of the invention, includes the step 354 of setting up a wellness program for employees of an employer. Optionally, this can be done via collaboration facilitated by an operator of a payment network (by way of example and not limitation, an operator of a payment network 208 configured to facilitate transactions between multiple issuers and multiple acquirers). Where collaboration is carried out, it can be, for example, among an employer entity (for example, the employer 350 alone or the employer 350 together with wellness vendor 352) and at least one of the issuers (which is a card issuer, such as a prepaid card issuer 210). The payment network is not necessarily limited to the kind configured to facilitate transactions between multiple issuers and multiple acquirers. In some cases, the program is set up by collaboration between the payment network operator and employer entity.

The method also includes step 366, namely, tracking participation in the program by at least a first one of the employees 202 of the employer 350, to determine if the at least first one of the employees has earned a reward by the participation. Furthermore, an additional step includes, responsive to determining that the at least first one of the employees has earned the reward by the participation, determining in decision block 374 whether the earning of the reward by the participation comprises an initial earned reward for the at least first one of the employees. A further step includes, responsive to determining that the earning of the reward by the participation is indeed the initial earned reward for the at least first one of the employees, creating a reward payment card for the at least first one of the employees, as in step 376, initializing an amount associated with the reward payment card for the at least first one of the employees, as in step 380, and providing the reward payment card to the at least first one of the employees, as in step 378. In some instances, the reward payment card is a stored value reward card. As used herein, a stored value reward card includes any kind of payment card or payment device which is configured in accordance with a payment system standard and/or specification and which acts as a token to access a balance stored on a central server, using a conventional authorization request and response. The invention is not limited to stored value reward cards. The reward payment card can be any payment card or payment device usable in a payment network 208 configured to facilitate transactions between multiple issuers and multiple acquirers and/or in one or more proprietary or closed payments networks with only a single issuer and acquirer. When the reward payment card is a stored value reward card, the amount associated with the reward payment card is the balance of the stored value reward card. When the reward payment card is a debit card, the amount associated with the reward payment card is the balance of the corresponding demand deposit and initializing it could include establishing it or adding an amount to an existing demand deposit account. When the reward payment card is a credit card (for example, a corporate card), the amount associated with the reward payment card could be the credit line and/or a statement credit; initially a credit line could be established and/or a statement credit applied and these could be updated as additional rewards were earned.

Optional but preferred additional steps include detecting subsequently-made purchases by the at least first one of the employees with the stored value reward card, as per steps 386, 388, and 390, and reporting to the employer purchase level data associated with the subsequently-made purchases, as per blocks 392 and 394. Preferably, the purchase level data that is reported is associated with at least those of the subsequently made purchases that are qualified purchases (i.e., qualified under the wellness program and/or under related governmental standards or guidelines, such as reimbursable under HSA/HRA/FSA guidelines or the like). Detecting may be facilitated by using a pre-defined product code for the stored value card, such as the above-identified MHA designated product code. A non-limiting example of purchase level data is the identity of items purchased. In one or more embodiments, merchant type (MCC) may be the lowest level of data provided; however, in other instances, item level detail may be provided. Note that, of course, in any case, due regard must always be had for privacy concerns. Accordingly, such purchase level data could be aggregated and/or rendered anonymous to protect privacy, or other suitable measures could be taken. To summarize, purchase level data can include, for example, one or more of identity of items purchased, merchant category code, merchant identity, and categories of items purchased. With regard to aggregation and privacy, in "earn" side 330, data must be account level because it is necessary to know which account to credit; however, this is preferably not transparent to the employer. On "burn" side 340, data can be rendered anonymous, for example, X % of people used their card for the gym, Y % at a health food store, and so on. This process of rendering data anonymous can be carried out, for example, by wellness vendor 352, entity 208, or the issuer and/or issuer processor. Other types of reporting can be provided; for example, aggregation between different program levels. It is presently preferred that privacy protection occurs in an automated fashion such that the employer would not have access to personally identifiable information.

The determining of step 366 can be carried out, for example, on the basis of a triggering event. Non-limiting examples of such an event include smoking cessation, weight management achievement, stress reduction achievement, meeting with a dietician, carrying out a health self-assessment, receiving adoption assistance, and meeting a fitness goal (for example, running a distance in a certain time, doing a certain number of push ups, or even using a treadmill or other exercise equipment having a computer link to report performance, subject to appropriate privacy safeguards).

The reward payment card can, in some circumstances, be an open access card. In such a case, an additional step could include applying a personalized savings service (for example, within block 388) to the subsequently-made purchases made with the stored value reward card; this could be facilitated by the operator of the payment network. A non-limiting example of a personalized savings service that could be adapted to embodiments of the invention is the MasterCard Savings™ service, as provided by MasterCard International Incorporated of Purchase, N.Y., USA. Such service is a personalized service available to eligible MasterCard Debit and MasterCard Prepaid cardholders that offers savings on brands and services from well-known merchants. Eligible holders of Debit or Prepaid MasterCard® cards enjoy free access to discounts at thousands of stores. The skilled artisan will already be familiar with same from, for example, literature and/or web pages distributed or maintained by MasterCard International Incorporated of Purchase, N.Y., USA.

In other embodiments, the reward payment card is programmed exclusively for purchases related to at least one of health and wellness. As used herein, health is a reactive aspect, while wellness is a proactive aspect. Wellness can be construed to extend beyond medical issues; unlike health. Wellness also includes happiness, self-actualization, personal enrichment, and the like. A wellness vendor is considered to encompass one or both of wellness and health-related aspects.

After the first reward is earned and the card has been provided, tracking step 366 can be continued to determine if the given employee has earned a second reward by further participation; in such a case, step 374 is repeated and this time, the "NO" branch is followed, that is, responsive to determining that the second reward by the further participation is not the initial earned reward for the given employee, an additional step includes positively incrementing the amount associated with the reward payment card for the at least first one of the employees; this takes place for second and subsequent occurrences of step 380.

In another aspect, employers may design and administer matching criteria and thresholds which enable system inquiries to identify qualifying cardholder transactions. Once identified, the employer is notified of the qualifying transactions, and loads a subsequent matching amount to the cardholder's prepaid card.

Heretofore, employers have implemented and managed incentive programs for employees. These programs have included cash and non-cash incentives for employees. In some cases, the incentives have included various prepaid products. Once the incentive is awarded, the employer loses visibility into how the incentive is used. In one or more embodiments of the invention, an entity, such as, for example, an operator 208 of a payment network, provides a new functionality which allows an employer to make a preliminary award on a prepaid card, and then match the contributions based on how the preliminary funds are used. Matching could also be applied to subsequent rewards, wherein additional funds are loaded, as described above.

For example, employee "John" receives 50 dollars on a prepaid card for his participation in a smoking cessation program. If John spends his 50 dollars at the gym, he receives a matching usage reward from his employer of $50. If he spends his 50 dollars at the liquor store, there is no matching usage reward. Other levels of matching could be used rather than dollar for dollar, or a different type of additional incentive other than matching could be used; for example, if the employee spends all, or a sufficient percentage, of the funds on the reward card for appropriate (e.g., healthy) purposes, a fixed additional amount or other reward could be provided rather than a specific match. In another aspect, this could work in the "opposite" direction where for every dollar a person spends at an approved merchant, the employer would reward $0.50.

Existing processes and products do not attempt to identify or promote usage after the award of the incentive. One or more embodiments of the invention provide the ability to further incent the usage of the reward dollars. One significant but non-limiting application is to wellness programs where an employer wishes to promote healthy lifestyles. One or more embodiments of the invention employ merchant category codes (MCC) and/or other transaction indicators to identify spend categories and allow employers to match dollars spent in qualified categories.

For example, the reward card with the appropriate identifier (e.g., designated product code (such as MHA as employed by MasterCard International Incorporated of Purchase, N.Y., USA), as discussed above) is used by issuers to track and catalogue performance. When the employee uses the reward card to make a sufficient amount (threshold) of qualifying purchases (based on MCC or other purchase-level data, as described herein) with the reward card, the amount of such purchases is matched (by way of a non-limiting example, dollar-for-dollar), or some other additional incentive is provided to the employee. Load of value onto the card due to achieving wellness goals can be initiated in prepaid platform 426 based on tracking of the goals by incentive platform 418, as described above. Then, how the funds on the reward card are spent can be tracked on prepaid processing platform 426 and compared to the parameters in database 694 (to be discussed in connection with FIG. 6 below); when satisfied, additional (e.g., matching) value is loaded onto the card. The prepaid processor 426 has visibility into the details of transactions and thus is able to determine if funds are being spent in a manner that is consistent with the grant of additional value, based on the rules stored in database 694. Fulfillment (i.e., matching or other additional value load) could occur upon satisfaction of the criteria in database 694, and the employer could be alerted to fund the reward. Note that issuer 210 is depicted separately from platform 426 because often the issuers have standalone processors who manage their prepaid business, it being understood that in some cases platform 426 could be operated by the issuer 210 itself.

Figure 6:
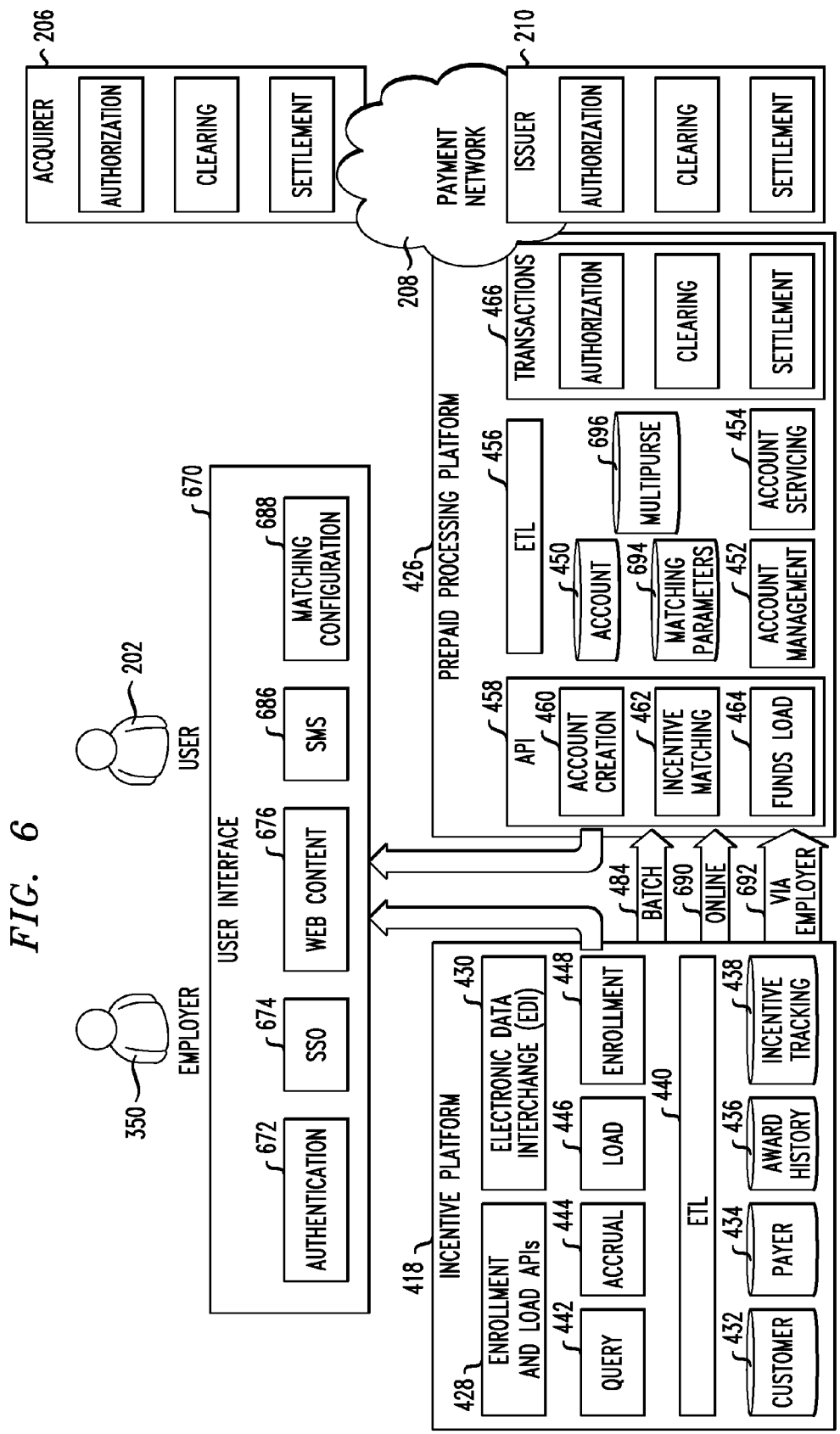
FIG. 6 is another exemplary system block diagram, according to yet another aspect of the invention.

Attention should now be had to FIG. 6, which shows an exemplary system block diagram. Elements similar to those in FIG. 4 have received the same reference character. The user here is indicative of the cardholder (employee) 202 in his or her capacity participating in the program.

Incentive platform 418 may be provided, by way of example and not limitation, by wellness vendor 352. Incentive platform 418 includes suitable enrollment and load application program interfaces (APIs) 428 and can also exchange data using electronic data interchange (EDI) as per block 430. In one or more embodiments, the EDI layer 430 provides integration through the translation and creation of various file formats, thus creating flexibility in the integration with the user interface 670, to be discussed further below. Suitable databases are provided for data warehousing of customer and payer data, as well as award history and incentive tracking, as shown at 432, 434, 436, and 438, respectively. Appropriate extract, transform, and load (ETL) functionality is provided, as shown at block 440, for purposes of extracting data from the above-mentioned databases 432, 434, 436, 438, transforming it to fit operational needs (in one or more embodiments, the ETL layer normalizes and reformats data as needed for subsequent communications, both internal and external), and loading it to databases 432, 434, 436, 438 as well as to the outputs from ETL module 440, namely, batch 484, online route 690, and via employer route 692.

In one or more embodiments, ETL module 440 sits between any external outputs and the database layer. Note that loading in this context is distinct from load block 446 to be discussed shortly. Query block 442 is provided for purposes of running queries on databases 432, 434, 436, 438. Certain activities may be cumulative in nature, meaning that more than one occurrence of the activity may be required to trigger a funding reward to the prepaid card. The accrual block 444 tracks these cumulative activities until they reach the reward threshold. Load block 446 communicates with prepaid processing platform 426 to effectuate funds load onto the reward card. In some instances, enrollment block 448 interfaces with wellness platform 402, seen in FIG. 4, so as to enroll a user 202. In an alternative approach, enrollment can be carried out by the UI 670.

Prepaid processing platform 426 may be provided, for example, by issuer/processor 210 (for example, an issuer or an issuer processor or the combination of both) and/or by the operator of network 208. Prepaid processing platform 426 includes an account database 450 with account management and servicing modules 452, 454, respectively. Appropriate extract, transform, and load (ETL) functionality is provided, as shown at block 456, for purposes of extracting data from the account database 450 (or any other data resident with the processor), and transforming it to fit operational needs (in one or more embodiments, the ETL layer normalizes and reformats data as needed for subsequent communications, both internal and external). API block 458 includes appropriate modules for account creation, account maintenance, and funds loading, as indicated at blocks 460, 462, and 464. A transactions module 466 handles authorization, clearing, and settlement, interacting with acquirer 206 (and in turn issuer 210) for such purposes over payment network 208.

Prepaid platform 426 can also include, for example, a matching parameters database 694, which may include, for example, data to which the purchase level data originated by the cardholder's transactions is compared. For example, database 694 may store merchant category codes or merchant identity, and purchases made with a reward card can be compared to same; if the merchant is acceptable (e.g., gym), the transaction is eligible for matching, while if the merchant is not acceptable (e.g., liquor store), the transaction is not eligible for matching. Other examples of purchase level data include identity and/or category of items purchased. Multipurse database 696 can be provided for the following situation: the rewards purse could be tied to an existing tax advantaged account, such that the rewards account effectively becomes a second purse, which can be stacked in the transaction sequence.

User interface 670 is provided to allow employer 350 and/or user 202 to interface with platforms 418, 426. Authentication module 672 may be provided to limit access to authorized persons (e.g., employer 350 and/or 202, and/or parties acting on their behalf); for example, using a password or the like. In at least some cases, a single sign-on function 674 is provided, where a single sign-on by employer 350 or user 202 allows access to both platform 418 and platform 426. Pertinent material from platform 418 and/or platform 426 may be displayed to employer 350 and/or user 202 as, for example, web content 676. Matching configuration module 688 may be provided to interface, for example, with matching parameters database 694. For example, module 688 may be provided to allow employer 350 to set allowable purchase-level data, as discussed above, which will trigger matching or the like.

User interface 670 can also communicate with employer 350 and/or user 202 using short message service (SMS), as indicated at 686. As noted, data can be moved from incentive platform 418 to prepaid processing platform 426 via batch mode 484, via an on-line technique 690, and/or via the employer, as shown at 692.

Figure 8:
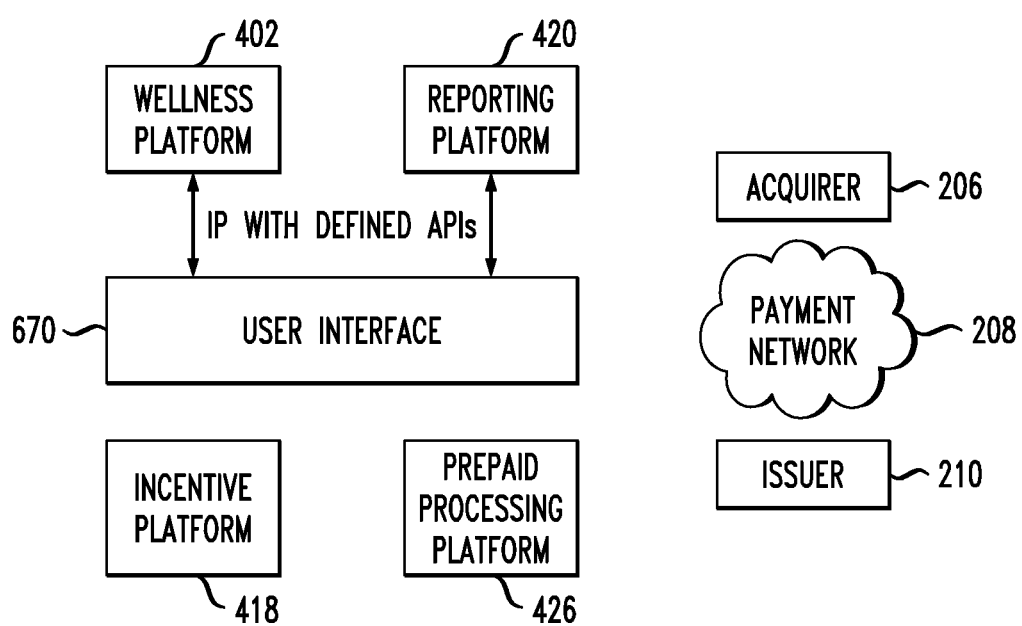
FIG. 8 is still another exemplary system block diagram, according to an even further aspect of the invention.

In another aspect, with reference to FIG. 8, elements 402 and 420 may be added to the system of FIG. 6. UI 670, in one or more embodiments, interfaces directly to elements 402 and 420 over IP (interne protocol), leveraging one or more defined application program interfaces (APIs). The interconnections between the other elements are omitted for brevity, but can be similar to those in FIGS. 4 and/or 6. In some instances, elements 402 and 420 may be realized as part of UI 670.

Figure 7:
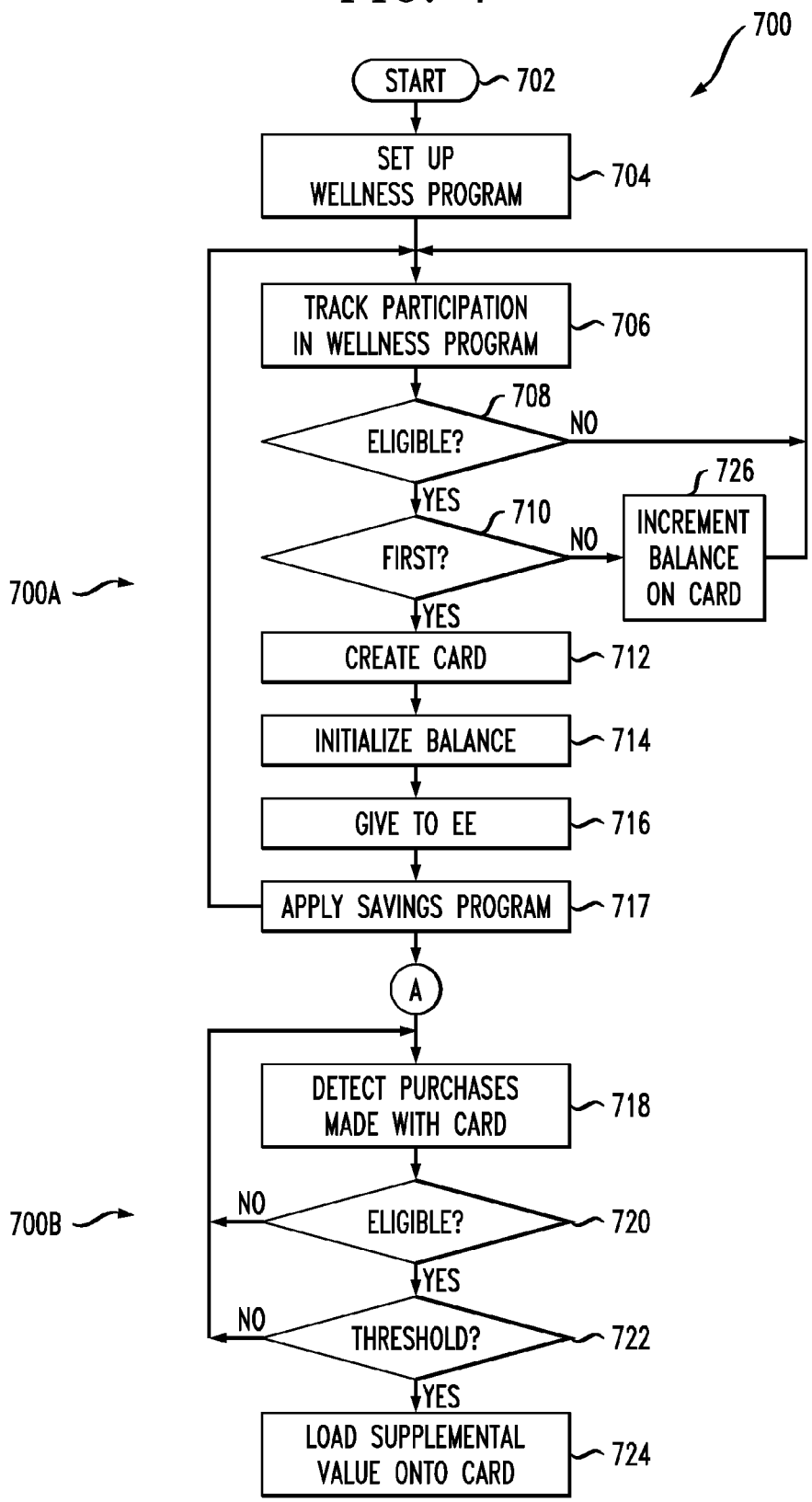
FIG. 7 is a flow chart of exemplary method steps, according to a further aspect of the invention.

Reference should now be had to flow chart 700 of FIG. 7, which includes a first process 700A and a second process 700B. Processing begins in step 702. Given the discussion thus far, it will be appreciated that, in general terms an exemplary method, according to one aspect of the invention, includes the step 704 of setting up a wellness program for employees of an employer. This can be carried out, for example, as described above with respect to FIGS. 3 and 4. Step 706 includes tracking participation in the program by at least a first one of the employees of the employer (for example, as described above with respect to FIGS. 3 and 4), to determine, in step 708, if the at least first one of the employees has earned a reward by virtue of the participation (e.g., has stopped smoking, attended the gym regularly, etc.). As per the "YES" branch of block 708, responsive to determining that the at least first one of the employees has indeed earned the reward by virtue of the participation, decision block 710 includes determining whether the earning of the reward by the participation is an initial earned reward for the at least first one of the employees. Again, this step can be carried out as described above with respect to FIGS. 3 and 4. If such is the case, as per the "YES" branch of decision block 710, steps 712-716 may be carried out. In particular, step 712 includes creating a reward payment card for the at least first one of the employees; step 714 includes initializing an amount associated with the reward payment card for the at least first one of the employees; and step 716 includes providing the reward payment card to the at least first one of the employees. Once again, these steps can be carried out as described above with respect to FIGS. 3 and 4.

Optional steps 717 and 726 are discussed below. Note that if the employee is found not yet eligible in step 708 ("NO" branch), continue tracking in step 706. Furthermore, subsequent to step 716 (and optional step 717), continue tracking in step 706.

Once the employee begins using the card to make purchases, process 700B may be carried out in parallel with process 700A just described, as indicated at "A." In particular, step 718 includes detecting subsequently-made purchases by the at least first one of the employees with the reward payment card (this step may be facilitated, for example, by the reward payment card having a predefined designated product code). This step can be implemented by prepaid processing platform 426. In decision block 720, based on purchase level data (e.g., identity of items purchased, merchant category code, merchant identity, and categories of items purchased) associated with the subsequently-made purchases, determine if the at least first one of the employees is eligible for a supplemental award (e.g., because the reward was spent in the health food store or on purchasing running or tennis shoes). This step can be implemented by prepaid processing platform 426 checking the purchase-level data against the parameters in database 694. Optional step 722 is discussed below. In step 724, responsive to determining that the at least first one of the employees is eligible for the supplemental award (because the reward was spent in an appropriate fashion), associate supplemental award value to the reward payment card. This can be carried out by block 464. If the purchase was not eligible ("NO" branch of block 720), continue to monitor purchases in step 718.

Step 720 preferably includes an issuing entity of the reward payment card comparing the purchase level data against supplemental award parameters (e.g., as described with respect to database 694). An issuing entity is defined to include an issuer processor or an issuer per se. In the typical case where the platform 426 is run separately from the issuer 210, it would normally be the issuer processor (but could be the issuer where the issuer operates platform 426).

As discussed elsewhere herein the supplemental award value could be a percentage match (defined herein as any percentage from just greater than zero to infinity; i.e., 100% would be a dollar-for-dollar match; 50% would be a 50 cent match per dollar appropriately spent; 200% would be a 2 dollar match per dollar appropriately spent). The supplemental award value could also be a predetermined fixed amount.

Other types of approaches are possible. For example, a prize could be awarded in conjunction with a load of value to a card. Furthermore, although a load of value to a card is presently believed to be a preferred approach, in other instances, a prize could be substituted for a load of value to a card.

With regard to optional step 726, after the initial earned reward, continue tracking step 706 to determine if the at least first one of the employees has earned a second reward by further participation. Responsive to determining that the at least first one of the employees has earned the second reward by the further participation, determine whether the earning of the second reward by the further participation is the initial earned reward for the at least first one of the employees, as in block 710; responsive to determining that the earning of the second reward by the further participation is not the initial earned reward ("NO" branch of block 710), positively increment the amount associated with the reward payment card for the at least first one of the employees, in step 726.

With regard to optional step 717, in some instances, apply a personalized savings service to the subsequently-made purchases made with the stored value reward card; this can be facilitated by the operator of the payment network.

With regard to optional step 722, it may not be efficient to constantly add small amounts of money to the card balance. Accordingly, in some cases, determining if the at least first one of the employees is eligible for the supplemental award further includes (following "YES" branch of block 720) comparing a monetary amount of those of the subsequently-made purchases having appropriate purchase-level data against a threshold, as in step 722. This can be carried out, in at least some instances, by logic in the platform 426. For example, the threshold is $100. The person buys vitamins for $10; this passes the eligibility hurdle of block 720 but is less than the threshold. Therefore, follow the "NO" branch of block 722 back to step 718 (storing the $10 value in memory). Next, the person buys cigarettes; this does not pass hurdle 720, so continue monitoring step 718. Next, the person buys gym shoes for $70; this passes hurdle 720 but the total eligible spend is $80 ($10 from vitamins plus $70 from gym shoes). Therefore, follow the "NO" branch of block 722 back to step 718 (storing the $80 value in memory). Next, the person buys orthotics for $35; this passes hurdle 720 and now the total eligible spend is $115 ($10 from vitamins plus $70 from gym shoes plus $35 from orthotics). Therefore, follow the "YES" branch of block 722 to step 724.

In some cases, step 704 is carried out via collaboration between at least an operator of a payment network and an employer entity. The employer entity can be the employer or the employer and a wellness vendor. In some instances, the payment network is of the kind configured to facilitate transactions between multiple issuers and multiple acquirers, and the collaboration is among the employer entity and at least one of the issuers (in the case where the reward payment card is a stored value reward card, the issuer is a prepaid card issuer).

Step 708 can, in some cases, include determining whether a triggering event has occurred (e.g., smoking cessation, weight management achievement, stress reduction achievement, meeting with a dietician, carrying out a health self-assessment, receiving adoption assistance, or meeting a fitness goal).

In some cases, the reward payment card is an open access card.

In some instances, even though appropriate spending is encouraged by the matching or other supplemental award, the reward payment card is programmed such that it cannot be used at predetermined restricted merchants.

For the avoidance of doubt, it should be emphasized that decision block 708 determines whether the employee has participated appropriately in the wellness program (e.g., exercising regularly) to warrant getting a reward on the stored value reward card. Decision block 720 determines whether purchases subsequently made with that reward card are for appropriate items (e.g., running shoes as opposed to cigarettes), such that matching or other supplemental award should be applied to the card balance.

As discussed above, the invention is not limited to stored value reward cards. The reward payment card can, as noted, be any payment card or payment device usable in a payment network 208 configured to facilitate transactions between multiple issuers and multiple acquirers and/or in one or more proprietary or closed payments networks with only a single issuer and acquirer; for example, a stored value reward card, a debit card, or a credit card, as set forth above. Associating supplemental award value to the reward payment card can be carried out appropriately depending on the type of card; in the case of a stored value reward card, it can include loading supplemental award value onto the card (e.g., by increasing a balance stored on a central server).

In another aspect, another exemplary method includes the step 706 of tracking participation in a wellness program for employees of an employer by at least a first one of the employees of the employer, to determine, in step 708, if the at least first one of the employees has earned a reward by virtue of the participation. A further step 716, responsive to a "YES," includes providing a reward payment card (again, possibly, but not limited to, a stored value card), with an initial amount associated therewith, to the at least first one of the employees. These steps can be carried out, for example, as described above with respect to FIGS. 3 and 4. Once the employee begins using the card to make purchases, step 718 includes detecting subsequently-made purchases by the at least first one of the employees with the reward payment card (this step may be facilitated, for example, by the stored value card having a predefined designated product code). In decision block 720, based on purchase level data (e.g., identity of items purchased, merchant category code, merchant identity, and categories of items purchased) associated with the subsequently-made purchases, determine if the at least first one of the employees is eligible for a supplemental award (e.g., because the reward was spent in the health food store or on purchasing running or tennis shoes). In step 724, responsive to determining that the at least first one of the employees is eligible for the supplemental award (because the reward was spent in an appropriate fashion), associate supplemental award value to the reward payment card. If the purchase was not eligible ("NO" branch of block 720), continue to monitor purchases in step 718. Steps 718, 720, and 724 can be carried out as described above.

System and Article of Manufacture Details

The invention can employ hardware and/or hardware and software aspects. Software includes but is not limited to firmware, resident software, microcode, etc. Software might be employed, for example, in connection with one or more of a terminal 122, 124, 125, 126, a processing center 140, 142, 144 (optionally with data warehouse 154) of a merchant, issuer, acquirer, processor, or payment processing network operator, and/or any of platforms 402, 418, 420, 426, and UI 670. Firmware might be employed, for example, in connection with payment devices such as cards 102, 112.

Figure 5:
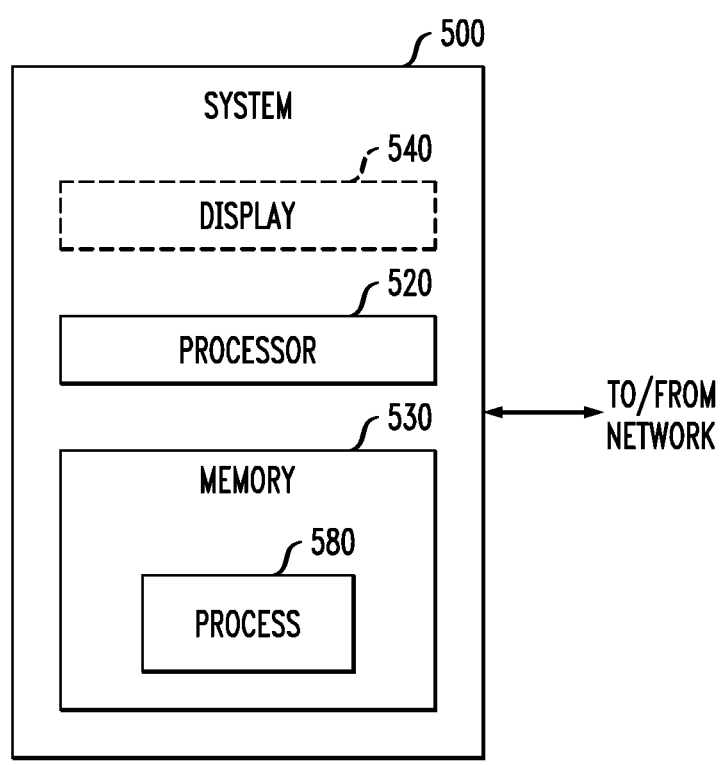
FIG. 5 is a block diagram of an exemplary computer system useful in one or more embodiments of the invention.

FIG. 5 is a block diagram of a system 500 that can implement part or all of one or more aspects or processes of the invention. As shown in FIG. 5, memory 530 configures the processor 520 (which could correspond, e.g., to processor portions 106, 116, 130, processors of remote hosts in centers 140, 142, 144, processors of servers associated with the platforms of FIGS. 4 and 6, and the like) to implement one or more aspects of the methods, steps, and functions disclosed herein (collectively, shown as process 580 in FIG. 5). Different method steps can be performed by different processors. The memory 530 could be distributed or local and the processor 520 could be distributed or singular. The memory 530 could be implemented as an electrical, magnetic or optical memory, or any combination of these or other types of storage devices (including memory portions as described above with respect to cards 102, 112). It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an ASIC rather than using firmware. Display 540 is representative of a variety of possible input/output devices (e.g., displays, mice, keyboards, and the like).

The notation "to/from network" is indicative of a variety of possible network interface devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a storage medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a server or processing center. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on elements 102, 112, 122, 124, 125, 126, 140, 142, 144, in platforms 402, 418, 420, 426, in UI 670, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 125, 126, processing centers 140, 142, 144 with data warehouse 154, payment devices such as cards 102, 112, UI 670, or servers of platforms 402, 418, 420, 426, can make use of computer technology with appropriate instructions to implement method steps described herein. By way of further example, a terminal apparatus 122, 124, 125, 126, could include, inter alia, a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card or read a magnetic stripe).

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 5) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable recordable storage media. All the modules (or any subset thereof) can be on the same medium, or each can be on a different medium, for example. The modules can include any or all of the components shown in the figures. In one or more embodiments, the modules include a wellness platform module, an incentive platform module, a processing platform module (for example, a prepaid processing platform module in the case of a prepaid card; an issuer and/or other financial institution processing platform module could be used in the case of a credit or debit card, for example), and a reporting platform module. In some instances, only a wellness platform module, incentive platform module, and processing platform module are provided. In some cases, only an incentive platform module and processing platform module are provided. A user interface module, an issuer platform module (e.g., sixth module discussed below), and an acquirer platform module (e.g., fifth module discussed below) can also be included, in one or more embodiments. The method steps can then be carried out using the distinct software modules of the system, as described above, executing on one or more hardware processors. For example, each platform in FIGS. 4, 6 and 8 could execute on a different hardware processor of a different server; the platforms 402, 418, and 420 could be on the same server with platform 426 on a separate server, and so on. Further, a computer program product can include a tangible computer-readable storage medium with code adapted to be executed to carry out one or more method steps described herein, including the provision of the system with the distinct software modules. The distinct software modules implementing platforms 402, 418, 420, 426 and/or UI 670 could include sub-modules to implement the blocks depicted therein. The functionality of acquirer 206 may be embodied in a fifth module, optionally with sub-modules for the authorization, clearing, and settlement functionality. The functionality of issuer 210 may be embodied in a sixth module, optionally with sub-modules for the authorization, clearing, and settlement functionality. As noted elsewhere, the platform 426 may or may not be operated by issuer 210; if so, it is possible that there could still be a separate sixth module, or such module and the platform 426 could be integrated. Payment network 208 functions as an interconnection between prepaid processing platform 426 and acquirer 206. In a preferred but non-limiting embodiment, regardless of which entities operate the platforms or modules, the platforms or modules exist independently as stand alone modules which can be leveraged. Modules or platforms existing within a single company or other entity may be more tightly integrated. The stand-alone architecture is believed to enable greater leveraging. Note that the UI 670 could also be provided by any of the entities including, for example, the processor 426 or the wellness vendor 418, or a third party. In one or more embodiments, UI 670 is a user facing front end web application. It interfaces to all of the back end applications and databases to provide a user interface of consolidated data. In at least some instances, the UI serves both cardholders and employers.

Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network, via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   setting up a wellness program for employees of an employer;
   tracking participation in said program by at least a first one of said employees of said employer, to determine if said at least first one of said employees has earned a reward by said participation;
   responsive to determining that said at least first one of said employees has earned said reward by said participation, determining whether said earning of said reward by said participation comprises an initial earned reward for said at least first one of said employees;

responsive to determining that said earning of said reward by said participation comprises said initial earned reward for said at least first one of said employees:
creating a reward payment card for said at least first one of said employees;
initializing an amount associated with said reward payment card for said at least first one of said employees; and
providing said reward payment card to said at least first one of said employees;
detecting subsequently-made purchases by said at least first one of said employees with said reward payment card;
based on purchase level data associated with said subsequently-made purchases, determining if said at least first one of said employees is eligible for a supplemental award, wherein said determining if said at least first one of said employees is eligible for said supplemental award further comprises comparing a monetary amount of those of said subsequently-made purchases having appropriate purchase-level data against a threshold, by executing, on at least one hardware processor, a processing platform module stored in a non-transitory manner on a tangible computer-readable recordable storage medium;
responsive to determining that said at least first one of said employees is eligible for said supplemental award, associating supplemental award value to said reward payment card.

2. The method of claim 1, further comprising providing a system, wherein said system comprises distinct software modules, each of said distinct software modules being stored in a non-transitory manner on said tangible computer-readable recordable storage medium, and wherein said distinct software modules comprise a wellness platform module, an incentive platform module, and said processing platform module;
wherein:
said step of setting up said wellness program is carried out at least by said wellness platform module executing upon said at least one hardware processor;
said steps of tracking participation and determining whether said earning of said reward by said participation comprises said initial earned reward are carried out at least by said incentive platform module executing upon said at least one hardware processor;
said step of creating said reward payment card for said at least first one of said employees is carried out at least by said processing platform module executing upon said at least one hardware processor;
said step of initializing said amount associated with said reward payment card for said at least first one of said employees is carried out at least by said incentive platform module executing upon said at least one hardware processor interacting with said processing platform module executing upon said at least one hardware processor;
said step of providing said reward payment card to said at least first one of said employees is carried out at least by said processing platform module executing upon said at least one hardware processor;
said step of detecting said subsequently-made purchases by said at least first one of said employees with said reward payment card is carried out at least by said processing platform module executing upon said at least one hardware processor; and said step of associating said supplemental award value to said reward payment card is carried out at least by said processing platform module executing upon said at least one hardware processor.

3. The method of claim 1, wherein said setting up is carried out via collaboration between at least an operator of a payment network and an employer entity.

4. The method of claim 3, wherein said employer entity comprises said employer.

5. The method of claim 3, wherein said employer entity comprises said employer and a wellness vendor.

6. The method of claim 5, wherein, in said step of setting up said wellness program, said payment network is of the kind configured to facilitate transactions between multiple issuers and multiple acquirers, said collaboration being among said employer entity and at least one of said issuers.

7. The method of claim 6, wherein said determining if said at least first one of said employees has earned said reward by said participation comprises determining whether a triggering event has occurred.

8. The method of claim 7, wherein said triggering event comprising one of smoking cessation, weight management achievement, stress reduction achievement, meeting with a dietician, carrying out a health self-assessment, receiving adoption assistance, and meeting a fitness goal.

9. The method of claim 6, wherein said reward payment card comprises an open access card.

10. The method of claim 9, further comprising applying a personalized savings service to said subsequently-made purchases made with said reward payment card, said application of said personalized savings service being facilitated by said operator of said payment network.

11. The method of claim 6, wherein said reward payment card is programmed such that it cannot be used at predetermined restricted merchants.

12. The method of claim 6, wherein said purchase level data comprises one or more of identity of items purchased, merchant category code, merchant identity, and categories of items purchased.

13. The method of claim 6, wherein said detecting is facilitated by said reward payment card having a predefined designated product code.

14. The method of claim 6, wherein said reward comprises a first reward, further comprising:
subsequent to said determining that said earning of said reward by said participation comprises said initial earned reward for said at least first one of said employees, continuing said tracking step to determine if said at least first one of said employees has earned a second reward by further participation;
responsive to determining that said at least first one of said employees has earned said second reward by said further participation, determining whether said earning of said second reward by said further participation is said initial earned reward for said at least first one of said employees; and
responsive to determining that said earning of said second reward by said further participation is not said initial earned reward for said at least first one of said employees, positively incrementing said amount associated with said reward payment card for said at least first one of said employees.

15. The method of claim 1, wherein said supplemental award value comprises a percentage matching award.

16. The method of claim 1, wherein said supplemental award value comprises a predetermined fixed amount.

17. The method of claim 1, wherein:
said reward payment card comprises a stored value reward card;
said amount associated with said reward payment card comprises a balance of said stored value reward card; and
said step of associating supplemental award value to said reward payment card comprises loading supplemental award value onto said reward payment card.

18. A method comprising the steps of:
tracking participation in a wellness program for employees of an employer by at least a first one of said employees of said employer, to determine if said at least first one of said employees has earned a reward by said participation;
responsive to determining that said at least first one of said employees has earned said reward by said participation, providing a reward payment card, with an initial amount associated therewith, to said at least first one of said employees;
detecting subsequently-made purchases by said at least first one of said employees with said reward payment card;
based on purchase level data associated with said subsequently-made purchases, determining if said at least first one of said employees is eligible for a supplemental award, wherein said determining if said at least first one of said employees is eligible for said supplemental award further comprises comparing a monetary amount of those of said subsequently-made purchases having appropriate purchase-level data against a threshold, by executing, on at least one hardware processor, a processing platform module stored in a non-transitory manner on a tangible computer-readable recordable storage medium; and
responsive to determining that said at least first one of said employees is eligible for said supplemental award, associating supplemental award value to said reward payment card.

19. The method of claim 18, further comprising providing a system, wherein said system comprises distinct software modules, each of said distinct software modules being stored in a non-transitory manner on said tangible computer-readable recordable storage medium, and wherein said distinct software modules comprise an incentive platform module, and said processing platform module;
wherein:
said step of tracking participation is carried out at least by said incentive platform module executing upon said at least one hardware processor;
said step of providing said reward payment card for said at least first one of said employees is carried out at least by said processing platform module executing upon said at least one hardware processor;
said step of detecting said subsequently-made purchases by said at least first one of said employees with said reward payment card is carried out at least by said processing platform module executing upon said at least one hardware processor; and
said step of associating said supplemental award value to said reward payment card is carried out at least by said processing platform module executing upon said at least one hardware processor.

20. A method comprising the steps of:
setting up a wellness program for employees of an employer;
tracking participation in said program by at least a first one of said employees of said employer, to determine if said at least first one of said employees has earned a reward by said participation;
responsive to determining that said at least first one of said employees has earned said reward by said participation, determining whether said earning of said reward by said participation comprises an initial earned reward for said at least first one of said employees;
responsive to determining that said earning of said reward by said participation comprises said initial earned reward for said at least first one of said employees:
creating a reward payment card for said at least first one of said employees;
initializing an amount associated with said reward payment card for said at least first one of said employees; and
providing said reward payment card to said at least first one of said employees;
detecting subsequently-made purchases by said at least first one of said employees with said reward payment card;
reporting to said employer purchase-level data associated with at least those of said subsequently-made purchases which are qualified purchases;
based on purchase level data associated with said subsequently-made purchases, determining if said at least first one of said employees is eligible for a supplemental award, wherein said determining if said at least first one of said employees is eligible for said supplemental award further comprises comparing a monetary amount of those of said subsequently-made purchases having appropriate purchase-level data against a threshold, by executing, on at least one hardware processor, a processing platform module stored in a non-transitory manner on a tangible computer-readable recordable storage medium; and
responsive to determining that said at least first one of said employees is eligible for said supplemental award, associating supplemental award value to said reward payment card.

21. The method of claim 20, further comprising providing a system, wherein said system comprises distinct software modules, each of said distinct software modules being stored in a non-transitory manner on said tangible computer-readable recordable storage medium, and wherein said distinct software modules comprise a wellness platform module, a reporting platform module, an incentive platform module, and said processing platform module;
wherein:
said step of setting up said wellness program is carried out at least by said wellness platform module executing upon said at least one hardware processor;
said steps of tracking participation and determining whether said earning of said reward by said participation comprises said initial earned reward are carried out at least by said incentive platform module executing upon said at least one hardware processor;
said step of creating said reward payment card for said at least first one of said employees is carried out at least by said processing platform module executing upon said at least one hardware processor;
said step of initializing said amount associated with said reward payment card for said at least first one of said employees is carried out at least by said incentive platform module executing upon said at least one hardware processor interacting with said processing platform module executing upon said at least one hardware processor;

said step of providing said reward payment card to said at least first one of said employees is carried out at least by said processing platform module executing upon said at least one hardware processor;

said step of detecting said subsequently-made purchases by said at least first one of said employees with said reward payment card is carried out at least by said processing platform module executing upon said at least one hardware processor; and said step of reporting to said employer said purchase level data associated with said at least those of said subsequently-made purchases which are qualified purchases is carried out at least by said reporting platform module executing upon said at least one hardware processor.

22. The method of claim 20, wherein said setting up is carried out via collaboration between at least an operator of a payment network and an employer entity.

23. The method of claim 22, wherein said employer entity comprises said employer.

24. The method of claim 22, wherein said employer entity comprises said employer and a wellness vendor.

25. The method of claim 24, wherein, in said step of setting up said wellness program, said payment network is of the kind configured to facilitate transactions between multiple issuers and multiple acquirers, said collaboration being among said employer entity and at least one of said issuers.

26. The method of claim 25, wherein said determining if said at least first one of said employees has earned said reward by said participation comprises determining whether a triggering event has occurred.

27. The method of claim 26, wherein said triggering event comprising one of smoking cessation, weight management achievement, stress reduction achievement, meeting with a dietician, carrying out a health self-assessment, receiving adoption assistance, and meeting a fitness goal.

28. The method of claim 25, wherein said reward payment card comprises an open access card.

29. The method of claim 28, further comprising applying a personalized savings service to said subsequently-made purchases made with said reward payment card, said application of said personalized savings service being facilitated by said operator of said payment network.

30. The method of claim 25, wherein said reward payment card is programmed exclusively for purchases related to at least one of health and wellness.

31. The method of claim 25, wherein said purchase level data comprises one or more of identity of items purchased, merchant category code, merchant identity, and categories of items purchased.

32. The method of claim 25, wherein said detecting is facilitated by said reward payment card having a predefined designated product code.

33. The method of claim 25, wherein said reward comprises a first reward, further comprising:

subsequent to said determining that said earning of said reward by said participation comprises said initial earned reward for said at least first one of said employees, continuing said tracking step to determine if said at least first one of said employees has earned a second reward by further participation;

responsive to determining that said at least first one of said employees has earned said second reward by said further participation, determining whether said earning of said second reward by said further participation is said initial earned reward for said at least first one of said employees; and responsive to determining that said earning of said second reward by said further participation is not said initial earned reward for said at least first one of said employees, positively incrementing said amount associated with said reward payment card for said at least first one of said employees.

34. The method of claim 20, wherein:

said reward payment card comprises a stored value reward card; and said amount associated with said reward payment card comprises a balance of said stored value reward card.

35. An apparatus comprising:

means for setting up a wellness program for employees of an employer;

means for tracking participation in said program by at least a first one of said employees of said employer, to determine if said at least first one of said employees has earned a reward by said participation;

means for, responsive to determining that said at least first one of said employees has earned said reward by said participation, determining whether said earning of said reward by said participation comprises an initial earned reward for said at least first one of said employees;

means for, responsive to determining that said earning of said reward by said participation comprises said initial earned reward for said at least first one of said employees:

creating a reward payment card for said at least first one of said employees;

initializing an amount associated with said reward payment card for said at least first one of said employees; and providing said reward payment card to said at least first one of said employees;

means for detecting subsequently-made purchases by said at least first one of said employees with said reward payment card;

means for, based on purchase level data associated with said subsequently-made purchases, determining if said at least first one of said employees is eligible for a supplemental award, wherein said means for determining if said at least first one of said employees is eligible for said supplemental award further comprise means for comparing a monetary amount of those of said subsequently-made purchases having appropriate purchase-level data against a threshold; and means for, responsive to determining that said at least first one of said employees is eligible for said supplemental award, associating supplemental award value to said reward payment card;

wherein:

said means for setting up said wellness program, said means for tracking, said means for determining whether said earning of said reward by said participation comprises an initial earned reward, said means for creating, said means for initializing, said means for providing, said means for detecting, said means for determining if said at least first one of said employees is eligible for said supplemental award, and said means for associating said supplemental award value to said reward payment card, comprise at least one of:

hardware modules; and software modules, said software modules being:

stored in a non-transitory manner in a tangible computer-readable recordable storage medium, loaded into a memory, and executed on at least one hardware processor coupled to said memory.

36. An apparatus comprising:

a memory; and at least one processor, coupled to said memory, and operative to:

facilitate setting up a wellness program for employees of an employer;

track participation in said program by at least a first one of said employees of said employer, to determine if said at least first one of said employees has earned a reward by said participation;

responsive to determining that said at least first one of said employees has earned said reward by said participation, determine whether said earning of said reward by said participation comprises an initial earned reward for said at least first one of said employees;

responsive to determining that said earning of said reward by said participation comprises said initial earned reward for said at least first one of said employees:

facilitate creating a reward payment card for said at least first one of said employees;

initialize an amount associated with said reward payment card for said at least first one of said employees; and facilitate providing said reward payment card to said at least first one of said employees;

detect subsequently-made purchases by said at least first one of said employees with said reward payment card;

based on purchase level data associated with said subsequently-made purchases, determine if said at least first one of said employees is eligible for a supplemental award, wherein said determining if said at least first one of said employees is eligible for said supplemental award further comprises comparing a monetary amount of those of said subsequently-made purchases having appropriate purchase-level data against a threshold; and responsive to determining that said at least first one of said employees is eligible for said supplemental award, associate supplemental award value to said reward payment card.

37. The apparatus of claim 36, further comprising:

distinct software modules, each of said distinct software modules being stored in a non-transitory manner on a tangible computer-readable recordable storage medium, said distinct software modules comprising a wellness platform module, an incentive platform module, and a processing platform module;

wherein:

said at least one processor is operative to facilitate setting up said wellness program by executing at least said wellness platform module;

said at least one processor is operative to track participation and determine whether said earning of said reward by said participation comprises said initial earned reward by executing at least said incentive platform module;

said at least one processor is operative to facilitate creating said reward payment card for said at least first one of said employees by executing at least said processing platform module;

said at least one processor is operative to initialize said amount associated with said reward payment card for said at least first one of said employees by executing at least said incentive platform module and said processing platform module;

said at least one processor is operative to facilitate providing said reward payment card to said at least first one of said employees by executing at least said processing platform module;

said at least one processor is operative to detect said subsequently-made purchases by said at least first one of said employees with said reward payment card by executing at least said processing platform module; and said at least one processor is operative to determine if said at least first one of said employees is eligible for said supplemental award by executing at least said processing platform module; and said at least one processor is operative to associate said supplemental award value to said reward payment card is carried out by executing at least said processing platform module.

38. A computer program product comprising a tangible computer readable recordable storage medium, said tangible computer readable recordable storage medium embodying computer usable program code stored thereon in a non-transitory manner and configured such that, when executed by at least one hardware processor, said computer usable program code causes said at least one hardware processor to:

facilitate setting up a wellness program for employees of an employer;

track participation in said program by at least a first one of said employees of said employer, to determine if said at least first one of said employees has earned a reward by said participation;

responsive to determining that said at least first one of said employees has earned said reward by said participation, determine whether said earning of said reward by said participation comprises an initial earned reward for said at least first one of said employees;

responsive to determining that said earning of said reward by said participation comprises said initial earned reward for said at least first one of said employees:

facilitate creating a reward payment card for said at least first one of said employees;

initialize an amount associated with said reward payment card for said at least first one of said employees; and facilitate providing said reward payment card to said at least first one of said employees;

detect subsequently-made purchases by said at least first one of said employees with said reward payment card;

based on purchase level data associated with said subsequently-made purchases, determine if said at least first one of said employees is eligible for a supplemental award, wherein said determining if said at least first one of said employees is eligible for said supplemental award further comprises comparing a monetary amount of those of said subsequently-made purchases having appropriate purchase-level data against a threshold; and responsive to determining that said at least first one of said employees is eligible for said supplemental award, associate supplemental award value to said reward payment card.

39. The computer program product of claim 38, wherein said computer program product comprises distinct software modules, each of said distinct software modules being stored in a non-transitory manner on said tangible computer-readable recordable storage medium, and wherein said distinct software modules comprise a wellness platform module, an incentive platform module, and a processing platform module;

wherein:

said wellness platform module comprises at least a portion of said computer usable program code for setting up said wellness program, said wellness platform module being configured to execute upon said at least one hardware processor;

said incentive platform module comprises at least a portion of said computer usable program code for tracking participation and determining whether said earning of said reward by said participation comprises said initial earned reward, said incentive platform module being configured to execute upon said at least one hardware processor;

said processing platform module comprises at least a portion of said computer usable program code for facilitating creating said reward payment card for said at least first one of said employees, said processing platform module being configured to execute upon said at least one hardware processor;

said incentive platform module and said processing platform module comprise at least a portion of said computer usable program code for initializing said amount associated with said reward payment card for said at least first one of said employees, said incentive platform module and said processing platform module being configured to execute upon said at least one hardware processor;

said processing platform module comprises at least a portion of said computer usable program code for facilitating providing said reward payment card to said at least first one of said employees;

said processing platform module comprises at least a portion of said computer usable program code for detecting said subsequently-made purchases by said at least first one of said employees with said reward payment card; and said processing platform module comprises at least a portion of said computer usable program code for determining if said at least first one of said employees is eligible for said supplemental award; and said processing platform module comprises at least a portion of said computer usable program code for associating said supplemental award value to said reward payment card.

* * * * *